US012792467B2

(12) United States Patent
Yadav et al.

(10) Patent No.: US 12,792,467 B2
(45) Date of Patent: Nov. 10, 2026

(54) SINGLE POINT POLICY GENERATION USING METADATA-BASED BACKUP

(71) Applicant: Dell Products L.P., Round Rock, TX (US)

(72) Inventors: Sunil Yadav, Bengaluru (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,469

(22) Filed: Jul. 26, 2024

(65) Prior Publication Data

US 2026/0030114 A1 Jan. 29, 2026

(51) Int. Cl.
*G06F 11/1446* (2026.01)

(52) U.S. Cl.
CPC ...... *G06F 11/1451* (2013.01); *G06F 11/1464* (2013.01)

(58) Field of Classification Search
CPC ......................... G06F 11/1451; G06F 11/1454
See application file for complete search history.

(56) References Cited

U.S. PATENT DOCUMENTS 8,732,479 B1 5/2014 Henriksen
9,026,499 B1 5/2015 Rajimwale et al.
9,940,460 B1 4/2018 Derbeko et al.
11,256,574 B1 * 2/2022 Reddy ................. G06F 11/1461
12,210,416 B1 1/2025 Yadav et al.
2018/0018218 A1 1/2018 Rat et al.
2019/0250991 A1 8/2019 Lee et al.
2020/0104216 A1 4/2020 Wang et al.
2021/0117542 A1 4/2021 Bastide et al.
2021/0303413 A1 * 9/2021 Chopra ............... G06F 11/1435
2021/0334001 A1 * 10/2021 Chaturvedi ........... G06F 3/0619
2022/0043717 A1 2/2022 Yadav
2022/0092184 A1 3/2022 Trim et al.
2022/0358215 A1 11/2022 Shachar et al.
2022/0398170 A1 12/2022 Yadav et al.
2023/0205636 A1 6/2023 Yadav et al.
2024/0028488 A1 * 1/2024 Balcha ................ G06F 11/1461
2024/0028720 A1 1/2024 Luniya
2024/0103984 A1 3/2024 Yadav et al.
2024/0111633 A1 4/2024 Yadav et al.

* cited by examiner

*Primary Examiner* — Tony Wu
(74) *Attorney, Agent, or Firm* — Chamberlain, Hrdlicka, White, Williams & Aughtry; Aly Z. Dossa

(57) ABSTRACT

A method for providing a single-point promulgation of protection policies that includes receiving, at a backup storage and in connection with a backup operation, a metadata database associated with multiple hosts. The method also includes identifying, using the metadata database, each of the hosts associated with the metadata database. The method further includes identifying, for each of the identified hosts, a set of applications. In addition, the method includes retrieving a set of protection policies. Moreover, the method includes determining, based on the identified hosts and associated sets of applications and using the set of protection policies, a set of host protection policies, wherein each of the hosts is associated with a protection policy from the set of protection policies. Also, the method includes sending, to each of the hosts, an associated protection policy.

17 Claims, 6 Drawing Sheets

SINGLE POINT POLICY GENERATION USING METADATA-BASED BACKUP

BACKGROUND

Computing devices may provide services for users. To provide the services, the computing devices may generate data. The computing devices may provide and obtain data from other computing devices. The data may be important to the user. Data protection services may be performed to protect the data. The data protection services may include generating backups of data on one computing device and storing the backup on another computing device. The backup may include previously generated copies of the data. A user may desire to backup the previously generated copies of data.

SUMMARY

In general, certain embodiments described herein relate to a method for providing a single-point promulgation of protection policies that includes monitoring an application on a host. The method also includes making a first determination, based on the monitoring, that a host event has occurred. The method further includes obtaining, in response to the first determination, host metadata associated with the application. In addition, the method includes storing the host metadata in a backup-ready metadata database. Moreover, the method includes, after the storing: providing, in response to receiving a request to initiate a backup operation, the backup-ready metadata database to a backup storage; identifying, using the backup-ready metadata database, the host and the application associated with the host; retrieving a set of protection policies; determining, based on the identified host and application and using the set of protection policies, a host protection policy for the host; and sending the protection policy from the backup storage to the host, to cause the host to adjust its host protection policies using the protection policy.

In general, certain embodiments described herein relate to a method for providing a single-point promulgation of protection policies that includes receiving, at a backup storage and in connection with a backup operation, a metadata database associated with multiple hosts. The method also includes identifying, using the metadata database, each of the hosts associated with the metadata database. The method further includes identifying, for each of the identified hosts, a set of applications. In addition, the method includes retrieving a set of protection policies. Moreover, the method includes determining, based on the identified hosts and associated sets of applications and using the set of protection policies, a set of host protection policies, wherein each of the hosts is associated with a protection policy from the set of protection policies. Also, the method includes sending, to each of the hosts, an associated protection policy.

In general, certain embodiments described herein relate to a non-transitory computer readable medium (CRM) that includes computer readable program code, which when executed by a computer processor, enables the computer processor to perform a method for providing a single-point promulgation of protection policies that includes monitoring an application on a host. The method also includes making a first determination, based on the monitoring, that a host event has occurred. The method further includes obtaining, in response to the first determination, host metadata associated with the application. In addition, the method includes storing the host metadata in a backup-ready metadata database. Moreover, the method includes, after the storing: providing, in response to receiving a request to initiate a backup operation, the backup-ready metadata database to a backup storage; identifying, using the backup-ready metadata database, the host and the application associated with the host; retrieving a set of protection policies; determining, based on the identified host and application and using the set of protection policies, a host protection policy for the host; and sending the protection policy from the backup storage to the host, to cause the host to adjust its host protection policies using the protection policy.

Other aspects of the embodiments disclosed herein will be apparent from the following description and the appended claims.

BRIEF DESCRIPTION OF DRAWINGS

Certain embodiments will be described with reference to the accompanying drawings. However, the accompanying drawings illustrate only certain aspects or implementations by way of example and are not meant to limit the scope of the claims.

DETAILED DESCRIPTION

Figure 1:
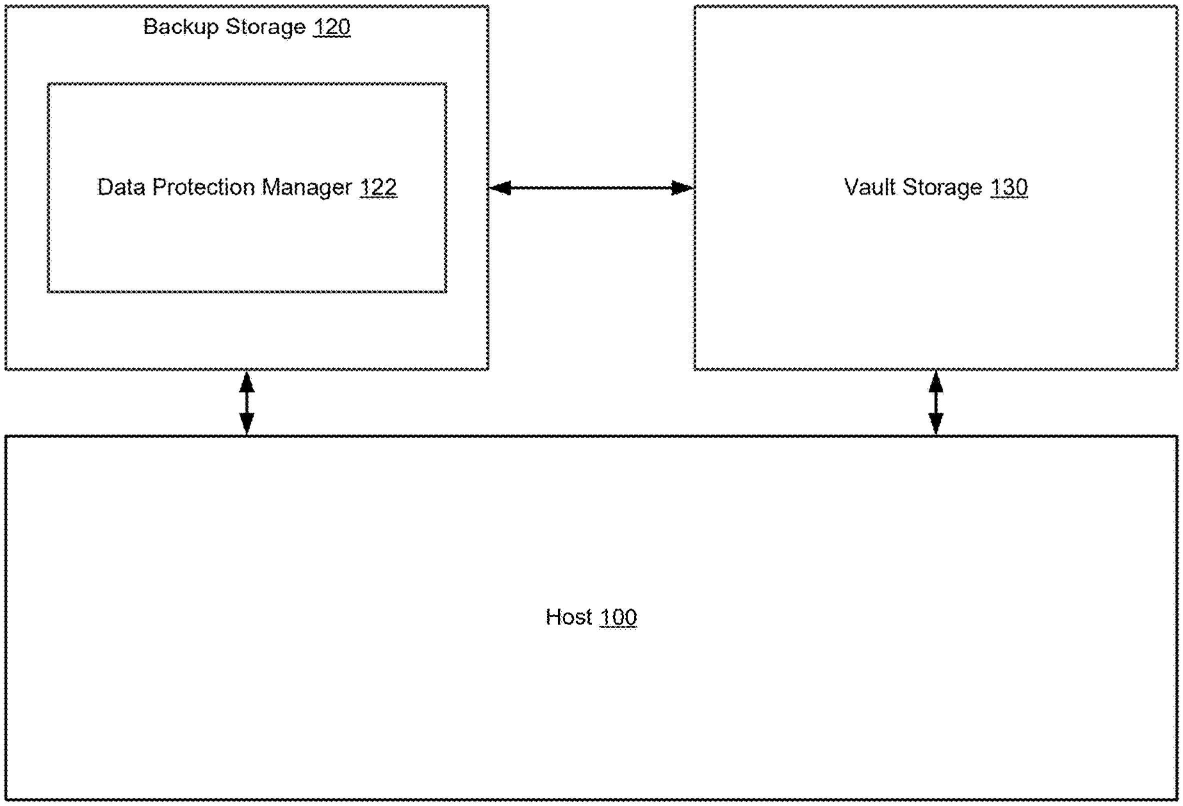
FIG. 1 shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In an organization, different hosts often install and use different applications which, in turn, generate different types of data. As such, each host may benefit from a customized set of protection policies to optimize the user's ease of use versus having appropriate protections in place. However, generating a customized set of policies on a per-host basis is time and resource intensive and may even require manual review.

To address, at least in part, the aforementioned issues discussed above, embodiments disclosed herein relate to systems, methods, and/or non-transitory computer readable mediums that provide functionality to generate policies on a per-host basis. More specifically, data from multiple hosts may already be collected at a singular location during normal operations through the usage of backups. These backups can include a wealth of metadata and other information about the hosts and applications utilized by the hosts, including their ages, types, etc. This metadata may then be accessed at the same location of the backups (e.g., at a backup storage) and analyzed to generate and promulgate policies on a per-host basis.

FIG. 1 shows a diagram a system in accordance with one or more embodiments disclosed herein. The system may include a host (100), a backup storage (120), and a vault storage (130). The components of the system illustrated in FIG. 1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1 is discussed below.

In one or more embodiments, the host (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (100) described herein and/or all, or a portion, of the methods illustrated in FIGS. 4-5. The host (100) may be implemented using other types of computing devices without departing from the embodiments disclosed herein. For additional details regarding computing devices, refer to FIG. 6.

The host (100) may be implemented using logical devices without departing from the embodiments disclosed herein. For example, the host (100) may include virtual machines that utilize computing resources of any number of physical computing devices to provide the functionality of the host (100). The host (100) may be implemented using other types of logical devices without departing from the embodiments disclosed herein.

In one or more embodiments, the host (100) may include the functionality to, or otherwise be programmed or configured to, perform computer implemented services for users of the host (100). The computer implemented services may include electronic mail communication services, database services, calendar services, inferencing services, and/or word processing services. The computer implemented services may include other and/or additional types of services without departing from embodiments disclosed herein. The host (100) may also include the functionality to perform local data protection services. The local data protection services may include generating backups, generating backup metadata, providing backup images and backup metadata to the backup storage (120), and performing backup and recovery operations in conjunction with the backup storage (120) and/or the vault storage (130). The local data protection services may include other and/or additional services without departing from embodiments disclosed herein. The host (100) may include the functionality to perform all, or a portion of, the methods discussed in FIGS. 4-5. The host (100) may include other and/or additional functionalities without departing from embodiments disclosed herein. For additional information regarding the host, refer to FIG. 2.

In one or more embodiments, the backup storage (120) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (120) described herein and/or all, or a portion, of the methods illustrated in FIGS. 4-5. The backup storage (120) may be implemented using other types of computing devices without departing from the embodiments disclosed herein. For additional details regarding computing devices, refer to FIG. 6.

The backup storage (120) may be implemented using logical devices without departing from the embodiments disclosed herein. For example, the backup storage (120) may include virtual machines that utilize computing resources of any number of physical computing devices to provide the functionality of the backup storage (120). The backup storage (120) may be implemented using other types of logical devices without departing from the embodiments disclosed herein.

In one or more embodiments, the backup storage (120) may include the functionality to, or otherwise be programmed or configured to, obtain and store backups generated on the host (100). The backup storage (120) may also include the functionality to provide all, or a portion, of the backups stored on the backup storage (120) to the host (100) for recovery operations, perform cyber recovery operations on backup images, and/or provide backup images to the vault storage (130). The backup storage (120) may include the functionality to perform all, or a portion, of the methods discussed in FIGS. 4-5. The backup storage (120) may include other and/or additional functionalities without departing from embodiments disclosed herein.

In one or more embodiments disclosed herein, the backup storage (120) may include one or more backup storages. The backup storage (120) may include any quantity of backup storages without departing from embodiments disclosed herein. In one or more embodiments, a backup storage of the backup storage (120) may include a backup storage type. The backup storage (120) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the backup storage (120) without departing from embodiments disclosed herein.

In one or more embodiments, the data protection manager (122) may be included as part of the backup storage (120), as a standalone device, and/or as a distributed device. In one or more embodiments, the data protection manager (122) is implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 4-5. The data protection manager (122) may be implemented using other types of computing devices without departing from embodiments disclosed herein. For additional details regarding computing devices, refer to FIG. 6.

In one or more embodiments, the data protection manager (122) may be implemented using logical devices without departing from embodiments disclosed herein. For example, the data protection manager (122) may include virtual machines that utilize computing resources of any number of physical computing devices to provide the functionality of the data protection manager (122). The data protection manager (122) may be implemented using other types of logical devices without departing from the embodiments disclosed herein.

In one or more embodiments, the data protection manager (122) may include the functionality to, or may be otherwise programmed or configured to, perform data protection management services for the data generated on the host (100). The data protection management services may include: (i) initiating the performance of data protection services by a data protection agent (discussed below) executing on the host based on user requests and/or protection policies, (ii) maintaining backup metadata associated with backups and/or data included within the backups, (iii) performing cyber recovery operations on backup images, and (iv) performing recovery operations to recover backups from the backup storage (120) and/or the vault storage (130) to the host (100).

The data protection management services may include other and/or additional services without departing from embodiments disclosed herein. The data protection manager (122) may include the functionality to perform all, or a portion of, the methods of FIGS. 4-5. The data protection manager (122) may include other and/or additional functionalities without departing from embodiments disclosed herein. For additional information regarding the data protection manager (122), refer to FIG. 3.

In one or more embodiments, the vault storage (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage (120) described herein and/or all, or a portion, of the methods illustrated in FIGS. 4-5. The vault storage (130) may be implemented using other types of computing devices without departing from the embodiments disclosed herein. For additional details regarding computing devices, refer to FIG. 6.

The vault storage (130) may be implemented using logical devices without departing from the embodiments disclosed herein. For example, the vault storage (130) may include virtual machines that utilize computing resources of any number of physical computing devices to provide the functionality of the vault storage (130). The vault storage (130) may be implemented using other types of logical devices without departing from the embodiments disclosed herein.

In one or more embodiments, the vault storage (130) may include the functionality to, or otherwise be programmed or configured to, obtain and store backups from the backup storage (120). For example, the vault storage (130) may be utilized as a long-term, secure, and/or reliable storage system that has less functionality than the backup storage (120). The vault storage (130) may include the functionality to perform all, or a portion, of the methods discussed in FIGS. 4-5. The vault storage (130) may include other and/or additional functionalities without departing from embodiments disclosed herein.

In one or more embodiments disclosed herein, the vault storage (130) may include one or more backup storages. The vault storage (130) may include any quantity of backup storages without departing from embodiments disclosed herein. In one or more embodiments, a backup storage of the vault storage (130) may include a backup storage type. The vault storage (130) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the vault storage (130) without departing from embodiments disclosed herein.

Although the system of FIG. 1 is shown as having a certain number of components (e.g., 100, 120, 130), in other embodiments disclosed herein, the system may have more or fewer components. For example, the functionality of each component described above may be split across components or combined into a single component. Further still, each component may be utilized multiple times to carry out an iterative operation.

Figure 2:
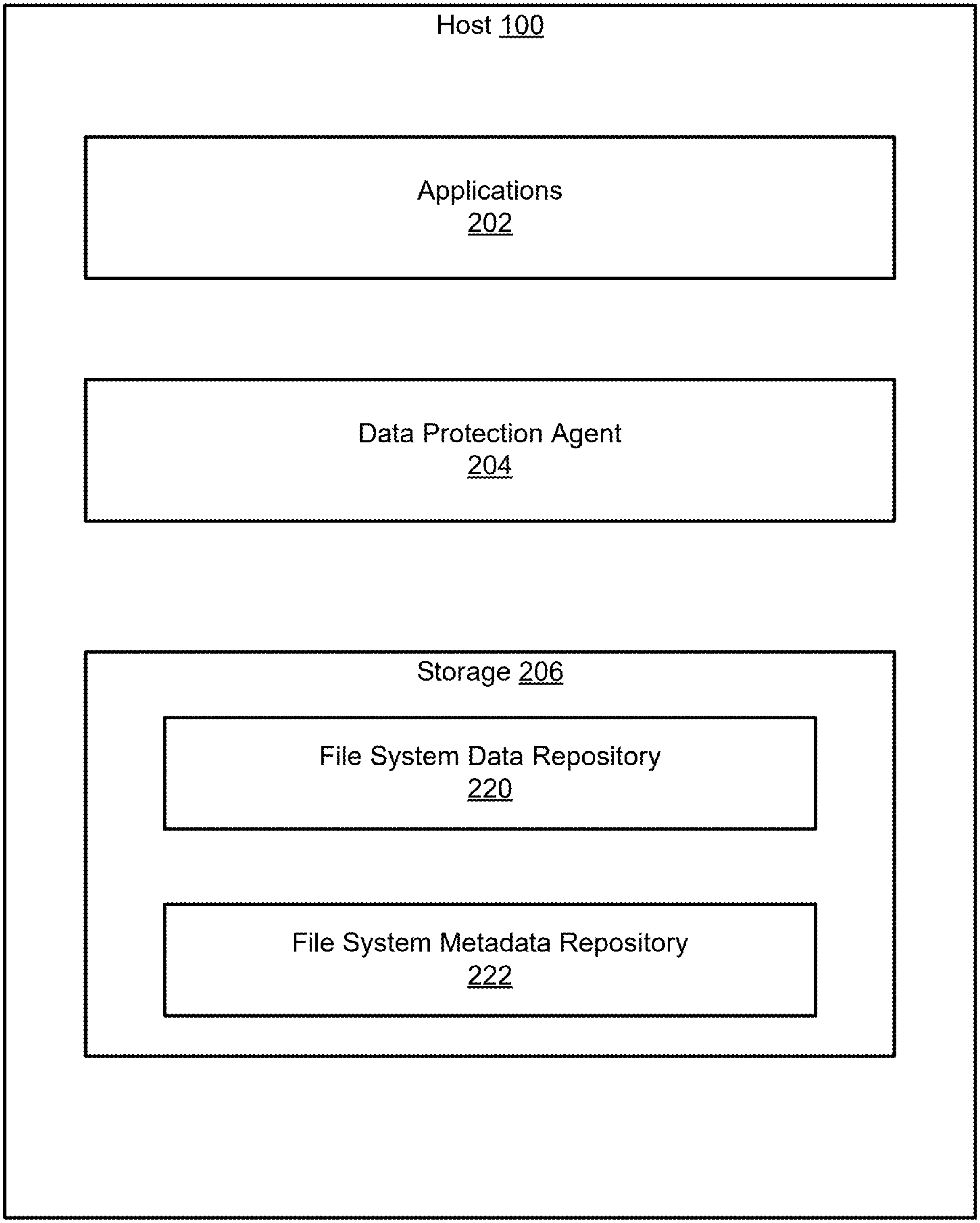
FIG. 2 shows a diagram of a host in accordance with one or more embodiments disclosed herein.

FIG. 2 shows a diagram of a host in accordance with one or more embodiments disclosed herein. The host (100) may be an embodiment of the host (100, FIG. 1A) discussed above. As discussed above, the host (100) may include the functionality to perform computer implemented services and local data protection services. To perform the aforementioned services, the host (100) may include applications (202), a data protection agent (204), and storage (206). The host (100) may include other, additional, and/or fewer components without departing from embodiments disclosed herein. For example, the host may include multiple data protection agents if multiple applications require distinct backup generation functionalities. As yet another example, the host may include multiple virtual machines. Each of the aforementioned components of the host (100) is discussed below.

In one or more embodiments disclosed herein, the host also includes one or more virtual machines that are implemented as computer instructions, e.g., computer code, stored on a storage (e.g., 206) that when executed by a processor of the host (100) causes the host (100) to provide the functionality of the virtual machine. The virtual machine may include the functionality to perform or otherwise provide computer implemented services to users. The virtual machine may include other and/or additional functionalities without departing from embodiments disclosed herein. The virtual machine may be managed by a hypervisor (e.g., computing instructions executing on the host (100)). For example, the hypervisor may be a Hyper-V hypervisor. The hypervisor may generate image backups (full and incremental) of VMs executing on the host (100).

In one or more embodiments, the applications (202) are included on the host, and may further be included within a virtual machine. Each of the applications (202) may be a portion of the computer instructions discussed above, which when executed by a processor of the host (100), causes the host (100) to perform a portion of the computer implemented services performed by the application (202). For example, a database application may perform database services, a word processing application may perform word processing services, and an electronic mail communication application may perform electronic mail communication services, etc.

In one or more embodiments disclosed herein, the data protection agent (204) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection agent (204) described throughout this Detailed Description.

In one or more embodiments disclosed herein, the data protection agent (204) is implemented as computer instructions, e.g., computer code, stored on a storage (e.g., 108) that when executed by a processor of the host (100) causes the host (100) to provide the functionality of the data protection agent (204) described throughout this Detailed Description.

In one or more embodiments disclosed herein, the data protection agent (204) is implemented using one or more external computing devices. Although such an implementation is not shown in the systems of FIG. 1 or FIG. 2, the one or more computing devices may be operatively connected to the host (100) enabling the data protection agent (204) to remotely interact with the host (100). For additional information regarding computing devices, refer to the discussion above with respect to FIG. 1 or the discussion below with respect to FIG. 6.

In one or more embodiments, the data protection agent (204) may include the functionality to perform the aforementioned local data protection services of the host (100). To perform the local data protection services, the data protection agent (204) may obtain requests and information from the data protection manager (122, FIG. 1) and send and respond to commands between the backup storage (120, FIG. 1), the vault storage (130), the host (100), and the applications (202). The sending and responding to the commands may result in the performance of all, or a portion, of the methods discussed in FIGS. 4-5. The commands may be associated with an Internet Protocol, such as, for example, Internet Small Computer Systems Interface (iSCSI). For additional information regarding the functionality of the data protection agent (204), refer to FIGS. 4-5.

In one or more embodiments, the storage (206) may be implemented using one or more volatile or non-volatile storages or any combination thereof. The storage (206) may include the functionality to, or otherwise be configured to, store and provide all, or portions, of information that may be used by the applications (202), and/or the data protection agent (204). The information stored in the storage (206) may include a file system data repository (220) and a file system metadata repository (222). The storage may include other and/or additional information without departing from embodiments disclosed herein. Each of the aforementioned types of information is discussed below.

In one or more embodiments disclosed herein, the applications (202) and/or users of the applications (202) generate data during the performance of computer implemented services. The data may be stored in a file system. In one or more embodiments disclosed herein, a file system is an organizational data structure that tracks how application data is stored and retrieved in a system (e.g., in storage (206) of the host (100), i.e., the file system data repository (220)). The file system may specify references to assets of applications and any asset data associated with each asset. An asset may be an individual data object in the file system. An asset may be, for example, an application (202), a portion of the file system, or the entirety of the file system. Each asset may include any number of elements (e.g., sub-assets). The elements may be, for example, snapshots, backup images, folders and/or files associated with an application (e.g., 202) or the host (100). Each file may include file data. The file data may include, for example, database data, calendar data, electronic mail communications data, etc.

In one or more embodiments, the file system data repository (220) may include one or more data structures that may be used to generate backups. The file system data repository (220) may include file data generated by the applications (202) and/or users of the applications (202) as discussed above. The file data may be any type of data such as database data and email data generated by users of the applications (202) without departing from the embodiments disclosed herein. Each asset (e.g., applications (202) or file system) may be associated with any number of sub-assets (e.g., files, snapshots, backup images, folders, etc.), each sub-asset may include any quantity of file data, and furthermore, each asset may include any number of elements without departing from embodiments disclosed herein. Users and/or applications (202) may use the file data of the file system data repository (220) when obtaining computer implemented services from the host (100). Additionally, the file data (e.g., backup-ready metadata) of the file system data repository (220) may be obtained and/or modified by the data protection agent (204) to generate backups, as described in further detail below in FIG. 4. The file data of the file system data repository (220) may be used by other and/or additional entities for other and/or additional purposes without departing from embodiments disclosed herein. Additionally, the file system data repository (220) may include other and/or additional types of information without departing from embodiments disclosed herein.

In one or more embodiments, the file system metadata repository (222) may include one or more data structures that include information regarding files included in the file system stored in the file system data repository (220). The information may include, for example, an entry for each file that includes: file identifiers associated with the file, the file length or size, one or more data runs associated with one or more data blocks of the file, data block identifiers associated with the one or more data blocks of the file, the creation date, the modification date, the asset identifier associated with the file, a parent file or folder associated with the file, a file system checksum value, a backup checksum value, and a recoverable identifier. The file system metadata repository (222) may include other and/or additional information associated with the files stored in the file system data repository (220) (as discussed below in FIGS. 4-5) without departing from embodiments disclosed herein. The file system metadata repository (222) may be used by the users of the applications (202) and/or the data protection agent (204) during the performance of computer implemented services. The file system metadata repository (222) may be used by the data protection agent (204) to generate backups and backup metadata, as discussed below. The information included in the file system metadata repository (222) may be generated by the applications (202), the host operating system, and/or users of the applications (202) during the performance of computer implemented services and stored in the file system metadata repository (222).

While the above data structures (e.g., 220, 222) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (206), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 3:
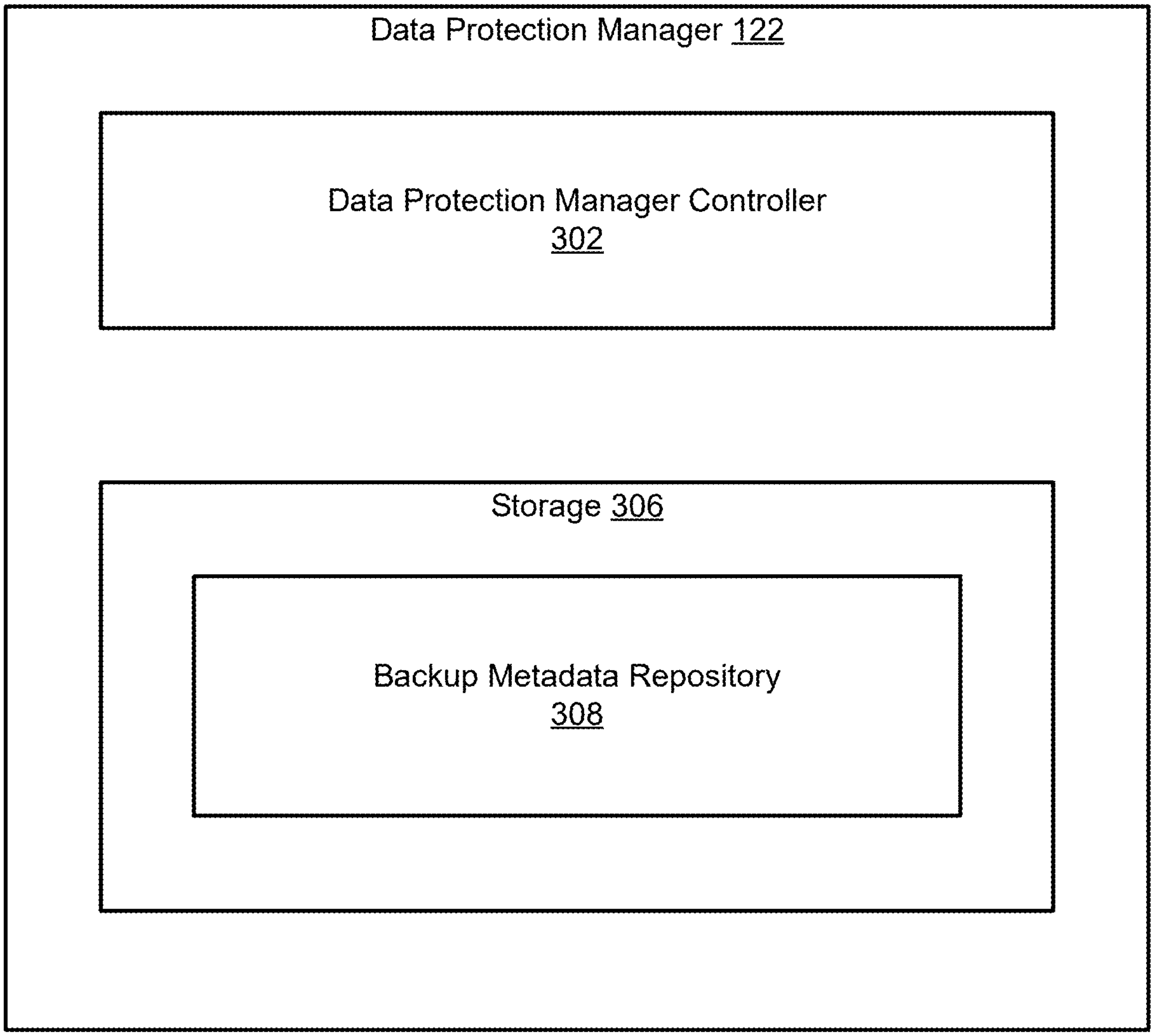
FIG. 3 shows a diagram of a data protection manager in accordance with one or more embodiments disclosed herein.

FIG. 3 shows a diagram of a data protection manager in accordance with one or more embodiments disclosed herein. The data protection manager (122) may be an embodiment of the data protection manager (122, FIG. 1 and/or 204, FIG. 2) discussed above. As discussed above, the data protection manager (122) may include the functionality to perform data protection management services. To perform the aforementioned services, the data protection manager (122) may include a data protection manager controller (302) and storage (306). The data protection manager (122) may include other, additional, and/or fewer components without departing from embodiments disclosed herein. Each of the aforementioned components of the data protection manager (122) is discussed below.

In one or more embodiments disclosed herein, the data protection manager controller (302) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection manager controller (302) described throughout this Detailed Description.

In one or more embodiments disclosed herein, the data protection manager controller (302) is implemented as computer instructions, e.g., computer code, stored on a storage (e.g., 306) that when executed by a processor of the data protection manager (122) causes the data protection manager (122) to provide the functionality of the data protection manager controller (302) described throughout this Detailed Description.

In one or more embodiments, the data protection manager controller (302) may include the functionality to perform the aforementioned data protection management services. To perform the data protection management services, the data protection manager controller (302) may send requests and information to the data protection agent (204, FIG. 2) to initiate the generation of backups and backup access services. The data protection manager controller (302) may perform all, or a portion, of the methods discussed in FIGS. 4-5. For additional information regarding the functionality of the data protection manager controller (302), refer to FIGS. 4-5.

In one or more embodiments, the storage (306) may be implemented using one or more volatile or non-volatile storages or any combination thereof. The storage (306) may include the functionality to, or otherwise be configured to, store and provide all, or portions, of information that may be used by users of the system and the data protection agent (204, FIG. 2) to perform backup access services and/or other data protection services without departing from embodiments disclosed herein. The information stored in the storage (306) may include a backup metadata repository (308). The storage (306) may include other and/or additional information without departing from embodiments disclosed herein.

In one or more embodiments, the backup metadata repository (308) may include one or more data structures that include information regarding backups of the data generated on the host (100, FIG. 1). The information may include, for example, for each backup, a backup identifier, a backup generation timestamp, and a storage location included in the backup storage. The information may also include, for each file/asset in a backup: a file identifier associated with the file, a file name associated with the file, the file length or size, data runs, the asset identifier associated with the file, a parent file or folder associated with the file, a host checksum value, a backup checksum value, and a recoverable identifier. The information may further include application information associated with the backups such as an application identifier, an application name, and an application type (e.g., database application, a word processing application, etc.). The backup metadata repository (308) may include a backup-ready metadata database (discussed below in FIGS. 4-5) that includes any of the above-discussed metadata from the host that is associated with a backup received from the host.

The backup metadata repository (308) may include other and/or additional information associated with backups of the data generated on the host (100, FIG. 1) without departing from embodiments disclosed herein. The backup metadata repository (308) may be used by the data protection agent (204, FIG. 2) during the performance of backup access services. The information included in the backup metadata repository (308) may be generated by the data protection agent (204, FIG. 2) during the backup generation and backup access services and stored in the backup metadata repository (308).

While the data structures and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (306), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 4:
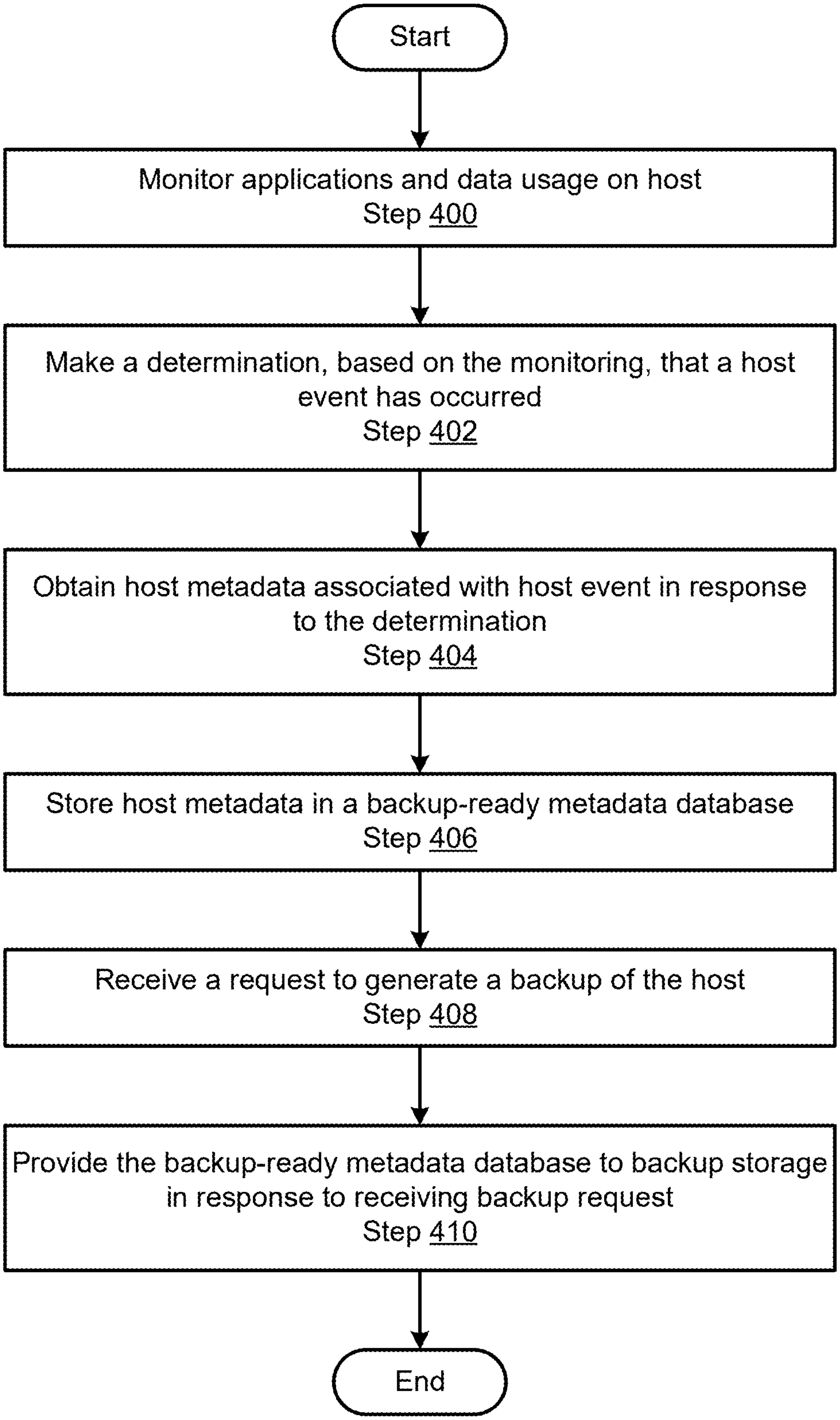
FIG. 4 shows a flowchart of a method for generating backup-ready metadata on a host in accordance with one or more embodiments disclosed herein.

FIG. 4 shows a flowchart of a method for monitoring applications and data usage within a host, which is usable to generate protection policies on a per-host basis from a single location. The method shown in FIG. 4 may be performed by, for example, a data protection agent (e.g., 204, FIG. 2). Other components of the system in FIGS. 1-3 may perform all, or a portion, of the method of FIG. 4 without departing from the scope of the embodiments described herein. While FIG. 4 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 400, the data protection agent monitors applications (e.g., 202, FIG. 2) and data usage on a host (e.g., 100, FIG. 2). In one or more embodiments, the data protection agent monitors for certain events to occur in association with the virtual machine, which may be considered a host event. In one or more embodiments, the host event includes any event in which an application changes a state, such as initiating, accessing data, writing data, interacting with other applications, terminating, or any other change in the usage of the application.

In Step 402, the data protection agent makes a determination, based on the monitoring in Step 400, that a host event has occurred. Then, in Step 404, the data protection agent obtains host metadata associated with the host event in response to the determination in Step 402. In one or more embodiments, the host metadata includes one or more of the following: application name, application identification, a list of files associated with the application, the starting and ending locations of each of the files associated with the application (e.g., a data run, length, etc.), how each of the files associated with the application are compiled, how the files associated with the application are stored, how the files associated with the application are restored, settings associated with the application, users associated with the application, a list of applications that the application interacts with, etc.

In one or more embodiments, a data run may be associated with a data of a file. The data may be stored as a span of data such as a data block. Each file may include one or more data blocks. A data run may include an offset and length. An offset may refer to one or more data structures that specify the distance from a reference point in a file system-based backup storage that includes the start of a file in the storage volume (e.g., virtual hard disk on the host or the backup storage). The distance may refer to the number of physical addresses or the quantity of data (e.g., bytes) between a reference point in the storage and the start of a file. The reference point may be a physical address that includes the first file of the backup or a base address in a storage. Because the backup image may be stored according to the hierarchy of files included in the storage, the offset may be used to collect only a specifically requested file in the backup image. The offset may be derived from the backup image itself or from the file system metadata (e.g., the parent file identifiers and the size or lengths of each file). The offset may include other and/or additional information without departing from embodiments disclosed herein.

In one or more embodiments, lengths may refer to one or more data structures that specify where a data and/or portions of data (e.g., sectors, data blocks, etc.) of a file begin and end in the storage of the host and/or the backup storage. The lengths may be obtained by the data protection agent based on the file system metadata and/or the backup image. The lengths may be pointers that reference locations in a backup storage where a data block or portion of a data block of a backup begins and ends. The lengths may be used to identify and obtain specific files or portions of files. Each length may be associated with a data block or a portion of a data of a file. Each length may be mapped to, or otherwise associated with, a file identifier of a file in the file system. The lengths may include other and/or additional information and may be used for other and/or additional purposes without departing from embodiments disclosed herein.

In Step 406, the data protection agent stores or causes to store the host metadata in a backup-ready metadata database. In one or more embodiments, the backup-ready metadata database is an embedded database such as SQLite. In one or more embodiments, the data protection agent creates checkpoints, such as a starting time and an ending time for Steps 400-406. In such a case, the backup-ready metadata database includes host metadata only from between the starting time and ending time. In one or more embodiments, the checkpoints are aligned with other data protection events, such as creation of snapshots, full backups, etc.

In Step 408, the data protection agent receives a request to generate a backup image of the host. In one or more embodiments, the data protection agent may obtain a request to generate a backup from the data protection manager (e.g., 122, FIG. 1). In one or more embodiments, the data protection agent is associated with multiple hosts and the request includes an identifier associated with the host targeted by the backup request. In one or more embodiments, the request includes backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. The request may be provided to the data protection agent using any appropriate method of data transmission without departing from embodiments disclosed herein. For example, the data protection manager may transmit the request as a message that includes one or more network packets through one or more network devices that operatively connect the data protection agent to the data protection manager.

In one or more embodiments, the data protection manager may send the request based on a protection policy associated with the host. The protection policy may be a data structure that specifies backup requirements (e.g., a backup schedule specifying points in time to generate backups, backup storage information associated with one or more backup storages to store the backup and/or portions of the backup, a retention period specifying an amount of time to keep the backup before deleting the backup, etc.). The protection policies may be generated by users and provided to the data protection manager, which may monitor the protection policies to initiate the performance of data protection services according to the backup requirements specified by the protection policy.

In another embodiment, the data protection manager sends the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The backup generation request associated with the VM may be obtained via other and/or additional methods without departing from embodiments disclosed herein.

In Step 410, the data protection agent provides the backup-ready metadata database to the backup storage in response to the request received in Step 408 and as part of providing a backup image to the backup storage. In one or more embodiments, as part of the providing, a backup image of the host is generated. In one or more embodiments, the data protection agent may use any appropriate backup image generation technique such as asset discovery or granular level recovery backup without departing from embodiments disclosed herein. In one embodiment, the data protection agent may generate the backup image. In an alternative embodiment, the data protection agent may initiate the generation of the backup image by one or more other entities or services (e.g., Volume Shadow-Copy Service (VSS), Logical Volume Manager, etc.). The backup image may be stored locally within a storage of the host. The backup image may be reflected in the file system data and file system metadata of the host. The backup image of the host may be generated via other and/or additional methods without departing from embodiments disclosed herein.

In one or more embodiments, the provision of the backup-ready metadata database also includes, prior to sending the backup-ready metadata database to a backup storage: (i) parsing the backup image to identify and retrieve metadata contained within the backup image and (ii) appending the backup-ready metadata database with the metadata retrieved from the backup image. In one or more embodiments, doing so may provide information regarding the use of the applications on the host and also details regarding where the applications and associated data are located within the backup image itself. As such, a more detailed and focused analysis may be performed on the backup image after it is sent to the backup storage. Further, in one or more embodiments, the data protection agent includes the current protection policies of the host in backup-ready metadata database.

In one or more embodiment, the method ends following Step 410.

Figure 5:
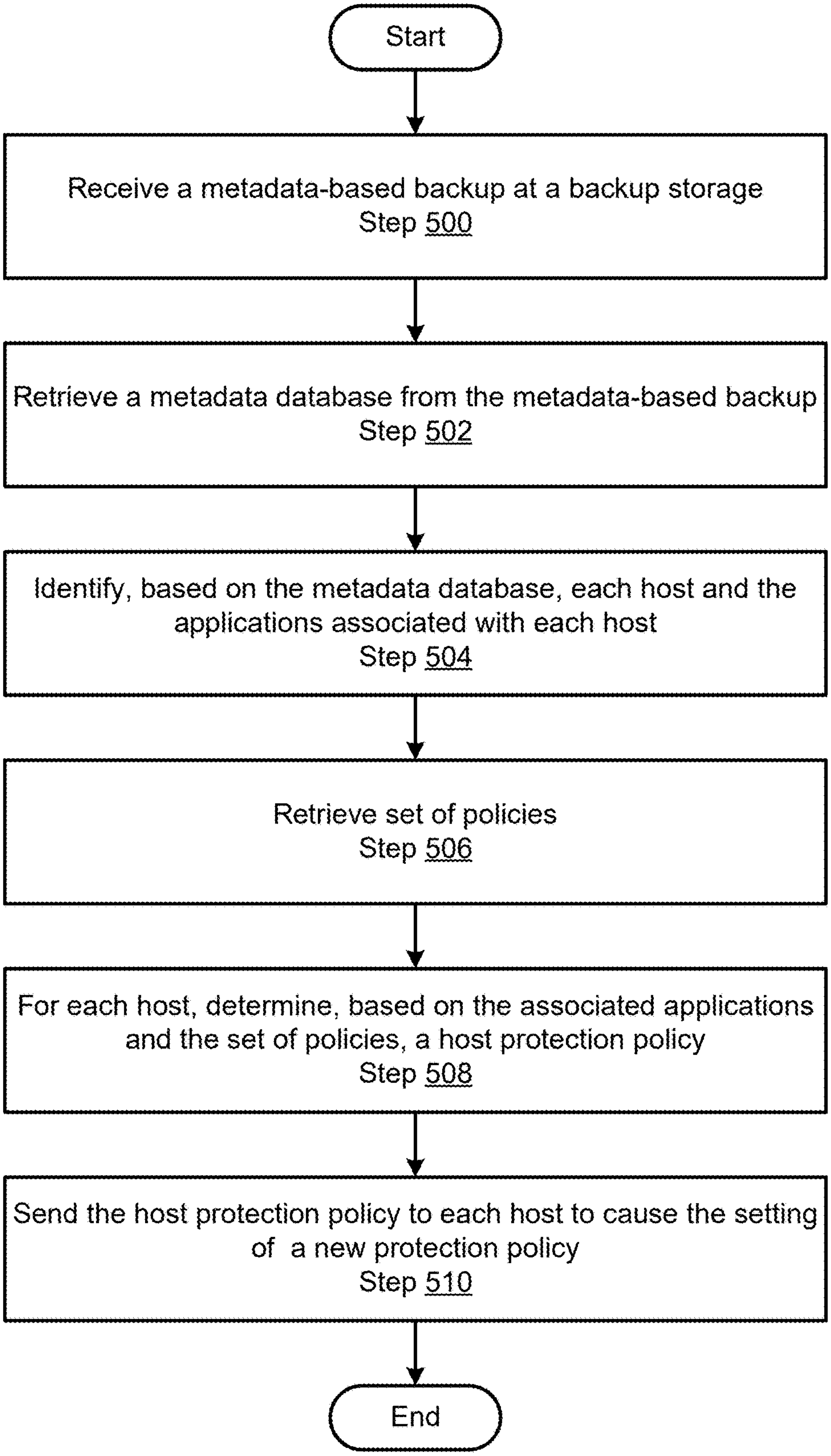
FIG. 5 shows a flowchart of a method for providing protection policies to hosts using backup metadata in accordance with one or more embodiments disclosed herein.

FIG. 5 shows a flowchart of a method for determining and promulgating protection policies at a backup storage and using the backup metadata in accordance with one or more embodiments disclosed herein. The method shown in FIG. 5 may be performed by, for example, a data protection manager (e.g., 122, FIG. 3). Other components of the systems in FIGS. 1-3 may perform all, or a portion, of the method of FIG. 5 without departing from the scope of the embodiments described herein. While FIG. 5 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 500, the data protection manager receives a metadata-based backup at a backup storage, which may include receiving the backup provided in Step 410 above. In addition, the backup includes a backup of the filesystem and a metadata database, which may include the backup-ready metadata database discussed in FIG. 4. In Step 502, the data protection manager retrieves the metadata database from the metadata-based backup.

In Step 504, the data protection manager identifies each asset contained within the backup based on the metadata database. In one or more embodiments, the identified asset includes any level of data contained within the backup, including hosts, filesystems, applications, files, etc., and may also include the relationships between each other at different levels. For example, the data protection manager may identify each host, each application associated with each host, and each file associated with each application.

In Step 506, the data protection manager retrieves a set of policies. In one or more embodiments, an organization maintains a set of rules-based policies that dictate what data protection policies (e.g., frequency of backups, type of backups performed, data retention periods, number of copies maintained, etc.) are applied based on various attributes of the assets. For example, data associated with a first group of users may receive a first set of data protection policies, while data associated with a second group of users may receive a second set of data protection policies. Further, data protection policies may be customized based on types of applications, types of data, jurisdictions in which the data originates, the frequency with which the data is accessed, user identities associated with the assets, etc. In addition, the data protection policies may include conflicts, and thus may also include rules regarding which policy should be implemented in the case there is a conflict. In one or more embodiments, the data protection policies are generated by a user, by an automated system, or by a combination thereof.

In Step 508, the data protection manager determines, for each host and based on the associated assets and the retrieved set of policies, a host protection policy. In one or more embodiments, the host backup policy applies to the host generally or is applied on a per-asset basis (e.g., a first application and a second application could have different protection policies even if both are on the same host). In one or more embodiments, the host protection policy includes any policy related to protection policies discussed above.

In one or more embodiments, the data protection manager also compares the determined host backup policy to the current backup policy for the host to determine whether there are any differences between the two policies. If there are no differences between the policies, the data protection manager may provide an indication of such to a user and the method may end. If there are differences between the policies, the data protection manager may provide an indication of such to a user and proceed to Step 510.

In Step 510, the data protection manager sends the associated host protection policy to each host to cause the host to set a new backup policy. In one or more embodiments, the host may already have a protection policy and the sending of the host protection policy causes the host to adjust its protection policy to match the host protection policy.

In one or more embodiments, the method ends following Step 510.

As can be seen, the method described in FIG. 5 provides a single-point promulgation of protection policies because many different hosts may send backups to a single backup storage. As such, a single entity can manage the protection policies for many different hosts, while also basing the protection policies on a plethora of information, thereby enhancing the accuracy, efficiency, and protection of the protection policies.

Figure 6:
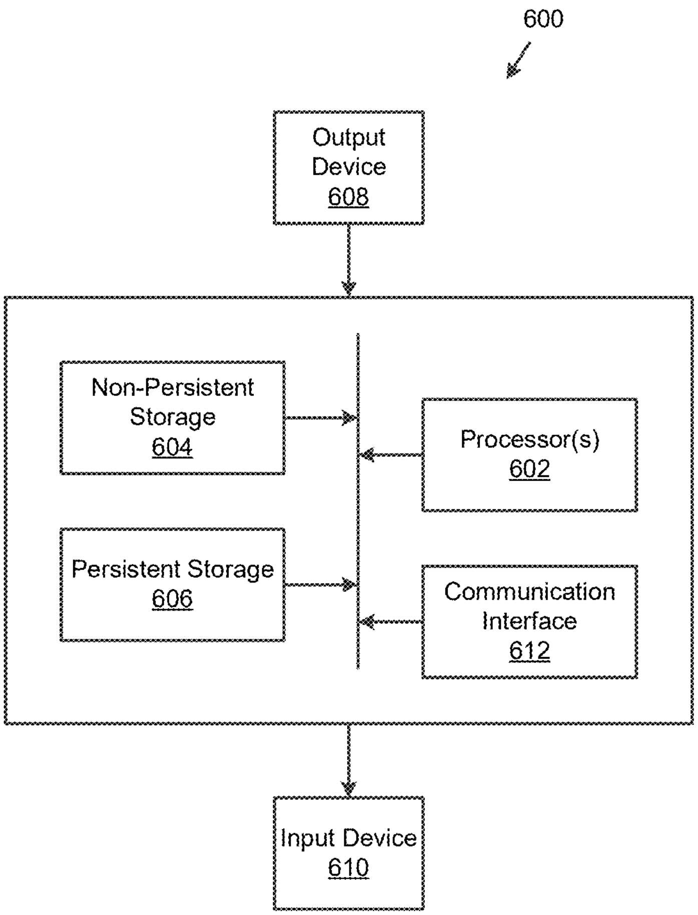
FIG. 6 shows a diagram of a computing device in accordance with one or more embodiments disclosed herein.

As discussed above, embodiments may be implemented using computing devices. FIG. 6 shows a diagram of a computing device in accordance with one or more embodiments. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an identifier may refer to a unique combination of alphanumeric characters associated with an entity that specifies that particular entity. The identifier may be local (usable by a single component) or global (usable by all components).

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments and should not be limited to solving the same/similar problems. The disclosed embodiments are broadly applicable to address a range of problems beyond those discussed herein.

One or more embodiments may be implemented using instructions executed by one or more processors of a computing device. Further, such instructions may correspond to computer readable instructions that are stored on one or more non-transitory computer readable mediums.

While the disclosure has been described above with respect to a limited number of embodiments, those skilled in the art, having the benefit of this disclosure, will appreciate that other embodiments can be devised which do not depart from the scope described herein. Accordingly, the scope described herein should be limited only by the attached claims.

What is claimed is:

1. A method for providing a single-point promulgation of protection policies, comprising:

monitoring an application on a host;

making a first determination, based on the monitoring, that a host event has occurred;

obtaining, in response to the first determination, host metadata associated with the application;

storing the host metadata in a backup-ready metadata database;

generating, in response to receiving a request to initiate a backup operation, a backup image of the host;

after the generating:

providing the backup-ready metadata database and the backup image to a backup storage;

identifying, by a data protection manager of the backup storage and using the backup-ready metadata database and the backup image, the host and a plurality of assets associated with the host;

retrieving, by the data protection manager, a set of protection policies, wherein each protection policy of the set of protection policies dictates a frequency of backups, a type of backup performed, data retention periods, and number of copies maintained;

determining, by the data protection manager and based on the identified host, application, and the set of protection policies, a host protection policy for each asset of the plurality of assets to obtain a set of host protection policies, wherein each host protection policy dictates a frequency of backups, a type of backup performed, data retention periods, and number of copies maintained, and wherein determining the host protection policy for each asset is based on a type of the application, a user identity associated with the host, and a type of data accessed by the application;

making a second determination, by the data protection manager, that the host protection policy differs from an existing protection policy on the host; and sending the host protection policy from the backup storage to the host in response to the second determination, wherein sending causes the host to adjust its existing host protection policies to match the set of host protection policies.

2. The method of claim 1, wherein the host event comprises an installation operation associated with the application, the application writing data to a storage, the application reading data from the storage, or the application executing.

3. The method of claim 1, wherein the host metadata comprises application name, application ID, a location of files associated with the application, metadata of files associated with the application, or a setting associated with the application.

4. The method of claim 1, wherein the backup operation comprises an asset discovery or a granular level recovery backup.

5. The method of claim 1, wherein the backup-ready metadata database is generated using SQLite.

6. The method of claim 1, wherein the set of protection policies is user-defined.

7. A method for providing a single-point promulgation of protection policies, comprising:

receiving, at a backup storage and in connection with a backup operation, a metadata database and a backup image associated with a plurality of hosts;

identifying, by a data protection manager of the backup storage and using the metadata database and the backup image, each of the plurality of hosts and a plurality of assets associated with the metadata database;

identifying, for each of the identified hosts, a set of applications;

retrieving, by the data protection manager, a set of protection policies, wherein each protection policy of the set of protection policies dictates a frequency of backups, a type of backup performed, data retention periods, and number of copies maintained, and wherein each of the hosts is associated with a protection policy from the set of protection policies;

determining, by the data protection manager and based on the identified host, application, and the set of protection policies, a host protection policy for each asset of the plurality of assets to obtain a set of host protection policies, wherein each host protection policy dictates a frequency of backups, a type of backup performed, data retention periods, and number of copies maintained, and wherein determining the host protection policy for each asset is based on a type of the application, a user identity associated with the host, and a type of data accessed by the application;

making a second determination, by the data protection manager, that the host protection policy differs from an existing protection policy on the host; and sending the host protection policy from the backup storage to the host in response to the second determination, wherein sending causes the host to adjust its existing host protection policies to match the set of host protection policies.

8. The method of claim 7, wherein the backup operation comprises an asset discovery or granular level recovery backup.

9. The method of claim 7, wherein the metadata database is generated using SQLite.

10. The method of claim 7, wherein the set of protection policies is user-defined.

11. The method of claim 7, wherein each of the set of protection policies is different from one another.

12. A non-transitory computer readable medium (CRM) comprising computer readable program code, which when executed by a computer processor, enables the computer processor to perform a method for providing a single-point promulgation of protection policies, the method comprising:

monitoring an application on a host;

making a first determination, based on the monitoring, that a host event has occurred;

obtaining, in response to the first determination, host metadata associated with the application;

storing the host metadata in a backup-ready metadata database;

generating, in response to receiving a request to initiate a backup operation, a backup image of the host;

after the generating:

providing the backup-ready metadata database and the backup image to a backup storage;

identifying, by a data protection manager of the backup storage and using the backup-ready metadata database and the backup image, the host and a plurality of assets associated with the host;

retrieving, by the data protection manager, a set of protection policies, wherein each protection policy of the set of protection policies dictates a frequency of backups, a type of backup performed, data retention periods, and number of copies maintained;

determining, by the data protection manager and based on the identified host, application, and the set of protection policies, a host protection policy for each asset of the plurality of assets to obtain a set of host protection policies, wherein each host protection policy dictates a frequency of backups, a type of backup performed, data retention periods, and number of copies maintained, and wherein determining the host protection policy for each asset is based on a type of the application, a user identity associated with the host, and a type of data accessed by the application;

making a second determination, by the data protection manager, that the host protection policy differs from an existing protection policy on the host; and sending the host protection policy from the backup storage to the host in response to the second determination, wherein sending causes the host to adjust its existing host protection policies to match the set of host protection policies.

13. The non-transitory CRM of claim 12, wherein the host event comprises an installation operation associated with the application, the application writing data to a storage, the application reading data from the storage, or the application executing.

14. The non-transitory CRM of claim 12, wherein the host metadata comprises application name, application ID a location of files associated with the application, metadata of files associated with the application, or a setting associated with the application.

15. The non-transitory CRM of claim 12, wherein the backup operation comprises an asset discovery or granular level recovery backup.

16. The non-transitory CRM of claim 12, wherein the backup-ready metadata database is generated using SQLite.

17. The non-transitory CRM of claim 12, wherein the set of protection policies is user-defined.

* * * * *